United States Patent [19]

Singer et al.

[11] Patent Number: 5,543,715
[45] Date of Patent: Aug. 6, 1996

[54] METHOD AND APPARATUS FOR MEASURING FORMATION RESISTIVITY THROUGH CASING USING SINGLE-CONDUCTOR ELECTRICAL LOGGING CABLE

[75] Inventors: Bension Singer; Hans M. Maurer; Kurt M. Strack, all of Houston; Otto N. Fanini, Stafford, all of Tex.

[73] Assignee: Western Atlas International, Inc., Houston, Tex.

[21] Appl. No.: 528,358

[22] Filed: Sep. 14, 1995

[51] Int. Cl.⁶ .................................................. G01V 3/24
[52] U.S. Cl. ................................. 324/368; 324/371
[58] Field of Search ................................. 324/366, 368, 324/371

[56] References Cited

U.S. PATENT DOCUMENTS

| | | | |
|---|---|---|---|
| 2,779,912 | 1/1957 | Waters | 324/371 |
| 2,986,693 | 5/1961 | Alder | 324/371 |
| 3,075,141 | 1/1963 | Lamb | 324/371 |
| 5,075,626 | 12/1991 | Vail, III | 324/368 |

*Primary Examiner*—Gerard R. Strecker
*Attorney, Agent, or Firm*—Richard A. Fagin

[57] ABSTRACT

A method of determining resistivity of an earth formation penetrated by a wellbore having conductive casing. The preferred embodiment includes inserting a sonde into the wellbore, the sonde having a plurality of electrodes at axially spaced apart locations adapted to electrically contact the casing, applying electrical current between a first and a second one of the electrodes and measuring the current, measuring a first voltage between a first pair of electrodes axially disposed between the first and second electrodes and measuring a second voltage between a second pair of electrodes also axially disposed between the first and second electrodes and disposed externally to the first pair to determine casing resistance in between the pairs of electrodes. A second difference between the first and second voltages is also measured. Current is applied between other electrodes axially disposed to exclude a third pair of electrodes therebetween, and a third voltage is measured between the third pair to determine characteristic impedance. Current is applied between the first electrode and a surface return electrode, a fourth voltage is measured between the first pair of electrodes, a fifth voltage is measured between the second pair of electrodes, an additional second difference of voltages between the fourth voltage and the fifth voltage is measured, and formation resistivity is determined by combining the first voltage, the second voltage, the third voltage, the fourth voltage, the fifth voltage, the current measurements, the second difference and the additional second difference of the voltages.

12 Claims, 8 Drawing Sheets

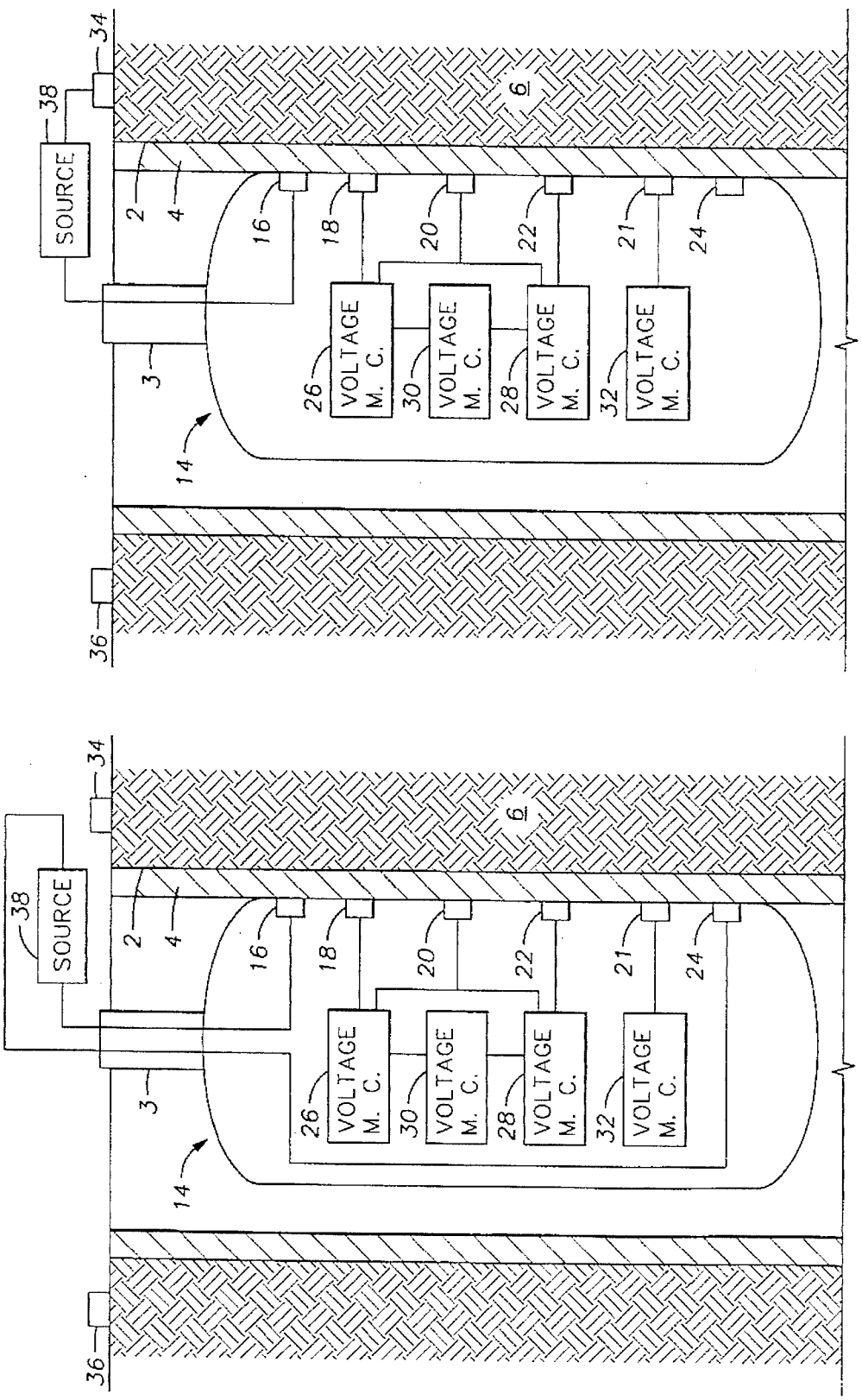

METHOD AND APPARATUS FOR MEASURING FORMATION RESISTIVITY THROUGH CASING USING SINGLE-CONDUCTOR ELECTRICAL LOGGING CABLE

BACKGROUND OF THE INVENTION

1. Field of the Invention

The present invention is related to the field of electrical resistivity logging of wellbores. More specifically, the present invention is related to apparatus and methods of measuring electrical resistivity of earth formations from within a wellbore having a steel casing inserted therein.

2. Description of the Related Art

Electrical resistivity measurements of earth formations, made from within a wellbore penetrating the earth formations, can be used to determine the presence of oil and gas in the earth formations. Numerous devices are known in the art for measuring earth formation resistivity. The devices for measuring resistivity known in the art are typically lowered into the wellbore at one end of an armored electrical cable. The devices send signals to equipment at the earth's surface which is electrically connected to the other end of the cable. The signals from the devices correspond to the formation resistivity.

The devices known in the art for measuring resistivity require that the wellbore remain as an "open hole", that is, not have a steel pipe or casing inserted into the wellbore. The devices known in the art for measuring formation resistivity are adversely affected by the presence of the casing in the wellbore since the resistivity of the casing can be smaller than $10^{-7}$ to $10^{-10}$ times the resistivity of the earth formations. The large resistivity contrast between casing and formation disrupts the measurements made by the typical resistivity measuring devices known in the art.

As is understood by those skilled in the art, casings are typically inserted into wellbores in order to maintain the mechanical and hydraulic integrity of the wellbore. It can be desirable from a standpoint of safety and ease of operation to measure resistivity from within a wellbore having casing inserted therein. It is also desirable, for reasons known to those skilled in the art, to be able to re-measure resistivity periodically in wellbores which have been completed and have been producing oil and gas. An apparatus for measuring resistivity in a wellbore having a casing therein is described, for example, in U.S. Pat. No. 5,075,626 issued to Vail.

A particular drawback to the apparatus described in the Vail '626 patent is that this apparatus requires using an electrical logging cable having more than one insulated electrical conductor. The reason that a cable having more than one insulated electrical conductor must be used with the apparatus in the Vail '626 patent is related to the way in which this apparatus measures a property of the formation and casing referred to as the characteristic impedance. A source of electric current is applied between a first electrode in electrical contact with the casing and a return electrode at the earth's surface. Voltage is then measured between an electrode disposed at the earth's surface and a second electrode in electrical contact with the casing and axially spaced apart from the first electrode. The first electrode and second (voltage measurement) electrode must be electrically connected to separate, insulated electrical conductors in order to measure electrical potential difference between the second electrode and the surface electrode while simultaneously energizing the casing and the earth. Although some types of well logging tools use the steel armor on the cable as another electrical conductor to carry electrical power to the tool in the wellbore, in the apparatus of the Vail '626 patent using the steel armor to carry the current from the source instead of using a second insulated conductor would distort the distribution of electrical current which is applied to the casing. The distortion would result from the fact that some of the electrical current would necessarily leak out through the steel armor wires into the wellbore and the casing.

Wellbores which have casings typically are "completed", or placed in a condition where oil and gas can flow to the earth's surface through the casing. Completed wellbores can have substantial fluid pressures within the casing, as is understood by those skilled in the art. In order to insert well logging apparatus into wellbores having substantial fluid pressures within the casing, it is desirable to use electrical well logging cables having small external diameters. Small diameter electrical cables typically include only one insulated electrical conductor. Accordingly, there is a need for an apparatus to measure formation resistivity in a wellbore having casing inserted therein which can operate using an electrical cable having only one insulated electrical conductor.

SUMMARY OF THE INVENTION

The present invention is a method and apparatus for determining the resistivity of an earth formation penetrated by a wellbore having a conductive casing inserted therein. The preferred embodiment of the method of the invention includes the step of inserting a sonde into the wellbore. The sonde includes a plurality of electrodes at axially spaced apart locations adapted to electrically contact the casing. Electrical current is applied between a first and a second one of the electrodes and the current is measured. A first voltage is measured between a first pair of electrodes axially disposed between the first and second electrodes, and a second voltage is measured between a second pair of electrodes, also axially disposed between the first and second electrodes and disposed externally to the first pair, to determine the casing resistance between the first and second pairs of electrodes. A second difference between the first and second voltages is also measured. Current is then applied to other ones of the electrodes axially positioned to exclude between them a third pair of electrodes, and a third voltage is measured between the third pair of electrodes to determine the characteristic impedance of the casing and the earth formation. Electrical current is then applied between the first electrode and a surface return electrode disposed at the earth's surface. A fourth voltage is measured between the first pair of electrodes, a fifth voltage is measured between the second pair of electrodes, and an additional second difference of voltages is measured between the fourth voltage and the fifth voltage. Formation resistivity is determined by combining measurements of the first voltage, the second voltage, the third voltage, the fourth voltage, the fifth voltage, the measurement of the current, the second difference and the additional second difference of the voltages.

The preferred embodiment of the apparatus includes an elongated sonde adapted to traverse the interior of the casing, a plurality of electrodes disposed on the sonde at axially spaced apart locations and adapted to be placed in electrical contact with the casing, voltage measuring circuits connected between pairs of the electrodes, at least two pairs of electrodes contiguous to one another, a voltage difference measuring circuit interconnected between two of the voltage measuring circuits and adapted to measure a second difference in voltage measured between the two voltage measuring circuits. The apparatus includes a source of electrical current which is selectively connectible between a first and a second one of the electrodes which are axially positioned to include the pairs of electrodes therebetween so that the casing resistance between the pairs of electrodes can be measured. The current source is also selectively connectible between other ones of the electrodes axially spaced apart to exclude a third pair of electrodes therebetween to enable measurement of characteristic impedance of the formation and casing. The source is also selectively connectible between one of the electrodes and a surface return electrode disposed at the earth's surface to enable measurement of current leakage along the casing. The apparatus includes means for recording the measurements made by the voltage measuring circuits, the voltage difference measuring circuit and the current measuring circuit.

An alternative embodiment of the method of the present invention includes the step of inserting a sonde having a plurality of electrodes into the wellbore. The electrodes are adapted to electrically contact the casing and are disposed at axially spaced apart locations along the sonde. Electrical current is injected and measured between a first one and a second one of the electrodes, the first one and the second one are axially spaced to include between the a pair of the electrodes connected to a voltage measuring circuit. A first voltage is measured between the first pair of electrodes. Electrical current is then injected and measured between the first electrode and a third electrode, the first and third electrodes axially spaced to exclude between them the pair of electrodes. A second voltage is measured between the pair of electrodes, and the resistivity of the earth formation is determined by combining the first voltage, the second voltage and the measurements of electrical current.

BRIEF DESCRIPTION OF THE DRAWINGS

FIG. 3 shows the tool as in FIG. 2 configured to determine the resistance of the casing over a short interval spaced between several of the electrodes on the tool.

FIG. 4 shows the tool as in FIG. 2 configured to determine the amount of current "leakage" out of the casing over the short interval as in FIG. 3.

DESCRIPTION OF THE PREFERRED EMBODIMENT

1. Principle of measurement of earth formation resistivity though a conductive casing.

In a wellbore penetrating earth formations into which a conductive metal pipe or casing has been inserted, measurement of earth formation resistivity using instruments well known in the art is typically precluded because the casing can have electrical resistivity many orders of magnitude smaller than the resistivity of the earth formation, as is understood by those skilled in the art.

Figure 1:
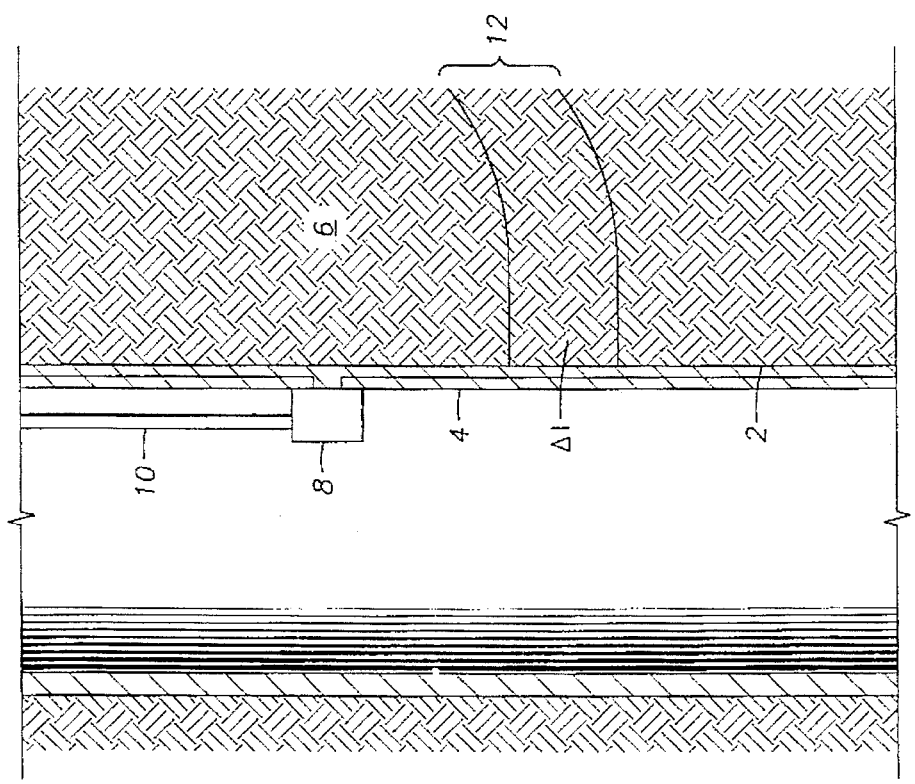
FIG. 1 shows an electrode emitting electrical current into a conductive metal casing inserted into a wellbore penetrating earth formations.

It has been determined, however, that it is possible to measure resistivity of earth formations from within a conductive casing. The principle of measurement of formation resistivity from within a conductive casing can be better understood by referring to FIG. 1. FIG. 1 shows a wellbore 2 drilled through earth formations, shown generally at 6. The wellbore 2 includes a conductive pipe or casing 4 inserted therein. An electrode 8 is placed in electrical contact with the casing 4. One terminal of a source of electric current (not shown in FIG. 1) located at the earth's surface is connected to the electrode 8. As is understood by those skilled in the art, the electrode 8 can form part of a logging sonde (not shown in FIG. 1 for clarity of the illustration) which is lowered in to the wellbore 2 at one end of an armored electrical cable 10. The cable 10 includes at least one insulated electrical conductor. The other terminal of the source of electric current (not shown) is typically connected to a current return electrode (not shown) disposed at the earth's surface.

The electrical current from the source (not shown) passes through the electrode 8 into the casing 4, where the electrical current travels both upwardly and downwardly through the casing 4. Some of the current "leaks" outwardly into the earth formations 6. Because of the current leakage, the amount of current flowing along the casing 4 at any point decreases as the distance (along the casing 4) from the electrode 8 increases. By measuring an amount of current leaking ($\Delta I$) from within a particular interval, shown generally at 12, it is possible to determine the resistivity of the earth formation 6 in contact with the casing 4 and generally disposed within the interval 12. If $V_o$ represents the voltage on the casing 4 with respect to infinity, then the resistivity of the formation 6 near the wellbore 2 and generally within the axial boundaries of the interval 12 is calculable by the expression: $V_o/\Delta I$. Apparent resistivity within the interval 12 can be defined by the expression:

$$\rho_a = k \cdot \Delta z \cdot \frac{V_0}{\Delta I} \quad (1)$$

wherein k is a dimensionless constant providing equality of apparent resistivity to the formation 6 resistivity under the conditions that the casing 4 and the formation 6 are homogeneous. $\Delta Z$ represents the length, along the casing 4, of the interval 12.

Figure 2:
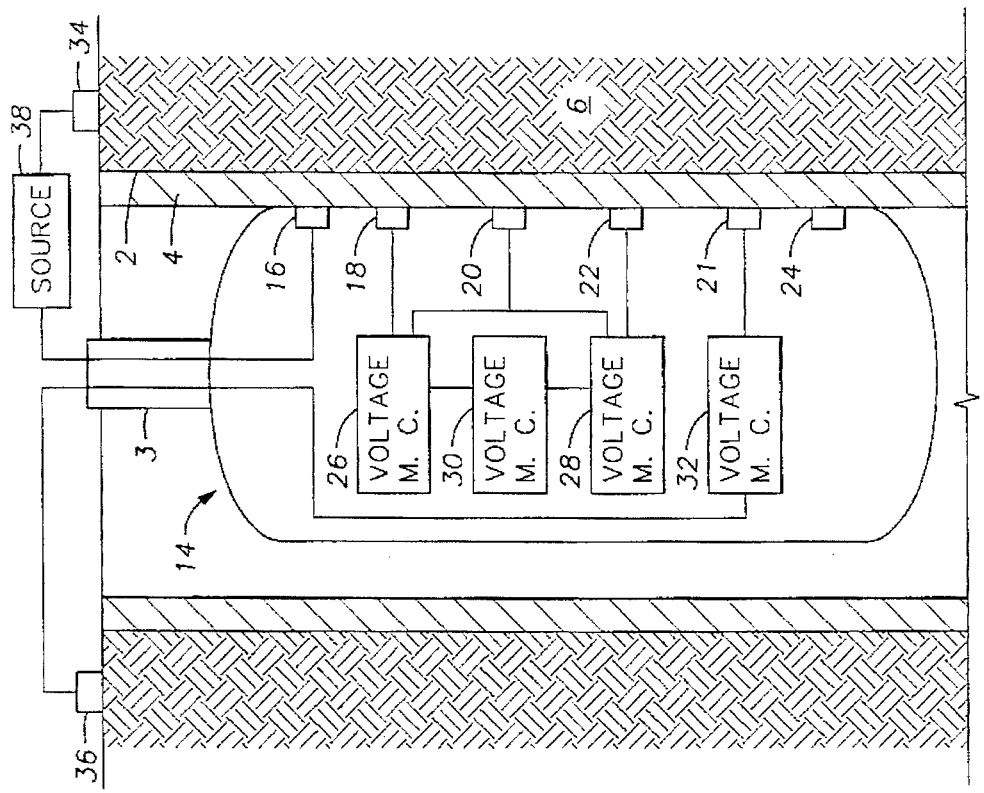
FIG. 2 shows a tool having a series of electrodes placed in contact with the casing. The tool in FIG. 2 is configured to measure the characteristic impedance of the casing and the earth.

A system for determining the amount of current leaking from within the interval 12 is shown generally in FIG. 2. The system shown in FIG. 2 can be similar to a system described, for example, in U.S. Pat. No. 5,075,626 issued to Vail. The system shown in FIG. 2 is included in the description of the present invention only to explain the principle of operation of devices which measure resistivity inside conductive casing, and is not to be construed as limiting the present invention. The system in FIG. 2 includes a sonde 14 which can be lowered into the wellbore 2 at one end of an armored electrical cable 3. The cable 3 in FIG. 3 includes at least two insulated electrical conductors, as will be further explained. The sonde 14 has electrodes disposed thereon, shown generally at 16, 18, 20, 22, 21 and 24. The electrodes can be selectively placed into electrical contact with the casing 4. The sonde 14 further includes first 26, second 28, third 30 and fourth 32 voltage measuring circuits. As is understood by those skilled in the art, the voltage measuring circuits must be capable of measuring very small voltages. In the case of the third measuring circuit 30, for example, the voltages needed to be measured can be as small as $10^{-9}$ volts.

A source of electrical current 38 is typically located at the earth's surface. As is understood by those skilled in the art, the source 38 preferably is a low-frequency alternating current source, usually having a frequency less than 10 Hz, to facilitate measurement of the extremely small voltages which are present between the electrodes as a result of energizing the casing 4. The sonde 14 can include a telemetry unit (not shown in FIG. 2 for clarity of the illustration) connected to each of the voltage measuring circuits for transmitting the measurements made by the voltage measuring circuits 26, 28, 30 and 32 to the earth's surface for observation, recording and interpretation by the system operator, as is understood by those skilled in the art.

A particular measurement needed to enable determination of the resistivity of the formation 6 through the casing 4 is referred to as the characteristic impedance, (Q), of the portion of the casing 4 and formation 6 which is energized by the source of electric current 38. In the system shown in FIG. 2, one terminal of the current source 38 is connected to one of the electrodes, referred to as an "emitter electrode" and shown at 16. The other terminal of the source 38 is connected to a surface electrode 34. A voltage drop is measured by the fourth voltage measuring circuit 32 between a surface potential electrode 36 also disposed at the earth's surface, and another one of the electrodes, called a voltage sensing electrode 21, disposed on the sonde 14. The characteristic impedance is calculated from the voltage $V_o$ measured by the fourth measuring circuit 32 according to the formula:

$$Q = \frac{V_o}{I_o} \qquad (2)$$

wherein $I_o$ represents the amount of current imparted by the source 38. The amount of current can either be controlled by appropriate design of the source 38, or the amount can be measured, as is understood by those skilled in the art. As is understood by those skilled in the art, it is necessary to perform the characteristic impedance measurement along the casing 4 only infrequently, approximately every 10 meters, depending on the resistivity of the formation 6.

It is then necessary to determine the resistance of the particular section of the casing 4 which is located between the pairs of electrodes 18, 20 and 20, 22. Determining the casing 4 resistance can be better understood by referring to FIG. 3. The sonde 14 as shown in FIG. 3 is electrically configured so that the current from the source 38 is now returned to a current return electrode 24 on the sonde 14, rather than to the surface electrode (as shown at 34 in FIG. 2). In the electrical configuration of FIG. 3, substantially all of the electrical current flows along the casing 4 between the emitter electrode 16 and the current return electrode 24 on the sonde 14. The current flow, when the sonde 14 is in the electrical configuration of FIG. 3, is referred to by $I_n$. The amount of the current which leaks from the casing 4 in the electrical configuration of FIG. 3 is negligible.

The first voltage measuring circuit 26 measures a voltage drop, represented by $V_1'$, between electrodes 18 and 20 which is related to the casing 4 resistance between electrodes 18 and 20. Similarly, the second voltage measuring circuit 28 measures a voltage drop, $V_2'$, between electrodes 20 and 22. The resistances of the casing 4 between the respective electrodes (18 and 20, and 20 and 22) can be determined by the expression:

$$R_1 = \frac{V_1'}{I_n} \; ; \; R_2 = \frac{V_2'}{I_n} \qquad (3)$$

The use of the casing resistance measurements thus determined will be further explained. Additionally, a second difference between voltage measurements made by the first 26 and second 28 measuring circuits, the second difference referred to as $\Delta V'$, can be made by the third voltage measuring circuit 30. The purpose of the second difference will be further explained.

The current source 38 can then be reconnected to return the current at the surface electrode 34. This electrical configuration can be observed by referring to FIG. 4. The current flow from the source 38 in the electrical configuration of FIG. 4 is referred to as $I_m$. Voltage drop is again measured by the first measuring circuit 26 between electrodes 18 and 20, this voltage drop referred to as $V_1$. Voltage drop is also again measured by the second measuring circuit 28 between electrodes 20 and 22, this voltage drop being referred to as $V_2$. Another second difference, referred to as $\Delta V$, is also measured by the third measuring circuit 30. The average current flowing along the casing 4 between electrodes 18 and 20 is related to $V_1/R_1$, and the average current flowing along the casing 4 between electrodes 20 and 22 is related to $V_2/R_2$. The average current flowing between electrodes 18 and 20 will be slightly different from the average current flowing between electrodes 20 and 22 because some of the current leaks out of the casing 4 into the formation 6. The amount of leakage current, $\Delta I$, can be determined according to the expression:

$$\Delta I = \frac{V_1}{R_1} - \frac{V_2}{R_2} \qquad (4)$$

The voltage present on the casing 4, with respect to infinity, can be determined as $Q \cdot I_m$. By substitution of equations (3) and (4) into equation (1), the apparent resistivity of the formation 6 can be determined by the expression:

$$\rho_a = K \cdot Q \cdot \frac{I_m}{I_n} \cdot \left[ \frac{V_1}{V_1'} - \frac{V_2}{V_2'} \right]^{-1} \qquad (5)$$

where K is a constant of proportionality, called a "tool factor", which is related by the expression:

$$K = k \cdot \Delta z \qquad (6)$$

$\Delta Z$ is equal to one-half the spacing between electrodes 18 and 22, and is referred to by the term "tool spacing".

The difference of the current flow between electrodes 18 and 20 and the current flow between electrodes 20 and 22 is very small, as previously explained. It is preferable, therefore, to use the two previously described "second difference" measurements made by the third measuring circuit 30, as shown in the electrical configurations in FIGS. 3 and 4. Substitution of the second difference measurements into equation 5 results in the following expressions for apparent resistivity of the formation 6:

$$\rho_a = K \cdot Q \cdot A \cdot \left[ \frac{\Delta V}{V_1} - \frac{\Delta V'}{V_1} \right]^{-1} \quad (7)$$

where A in equation (7) is equal to:

$$A = \frac{V_1/I_n}{V_1/I_m} \left[ 1 - \frac{\Delta V'}{V_1} \right] \quad (8)$$

The three electrical configurations shown in FIGS. 2, 3, and 4 provide the measurements required to determine resistivity of the formation 6 measured from inside the conductive casing 4.

2. The apparatus and method of the present invention.

A particular limitation to the configuration of the electrodes on the sonde 14 of the prior art shown in FIGS. 2, 3, and 4, can be better understood by again referring to FIG. 2. In FIG. 2 the source 38 is shown connected between the emitter electrode 16 and the surface electrode 34. The electrical configuration in FIG. 2 is used to energize the casing 4 and the formation 6 for determining the characteristic impedance (Q). The current path of the source 38 in the electrical configuration shown in FIG. 2 requires using an insulated electrical conductor in the cable 3. Using the armor wires on the cable 3 for conducting the electrical current would result in current leakage into the wellbore 2. As is also shown in FIG. 2, the fourth voltage measuring circuit 32 is connected between the potential electrode 21 on the sonde 14 and the surface potential electrode 36. The electrical connection of the fourth voltage measuring circuit 32 requires using another, separate, insulated electrical conductor in the cable 3. Measuring formation resistivity using the apparatus known in the prior art therefore requires using an electrical cable 3 having at least two insulated electrical conductors.

In certain wellbores, particularly those wellbores having substantial fluid pressure present within the casing, special equipment (not shown) is typically attached to the top of the casing to contain the fluid pressure while logging instruments are inserted into the wellbore. The equipment (not shown) used to contain fluid pressure is familiar to those skilled in the art. Using the equipment to contain the fluid pressure typically requires using an electrical cable having a small external diameter. Armored electrical cables known in the art having small diameter, which are suitable for use with the equipment for containing the fluid pressure, typically have only one insulated conductor. It is therefore not possible to use the system known in the prior art for measuring resistivity through casing using an electrical cable having only one insulated electrical conductor.

Figure 5:
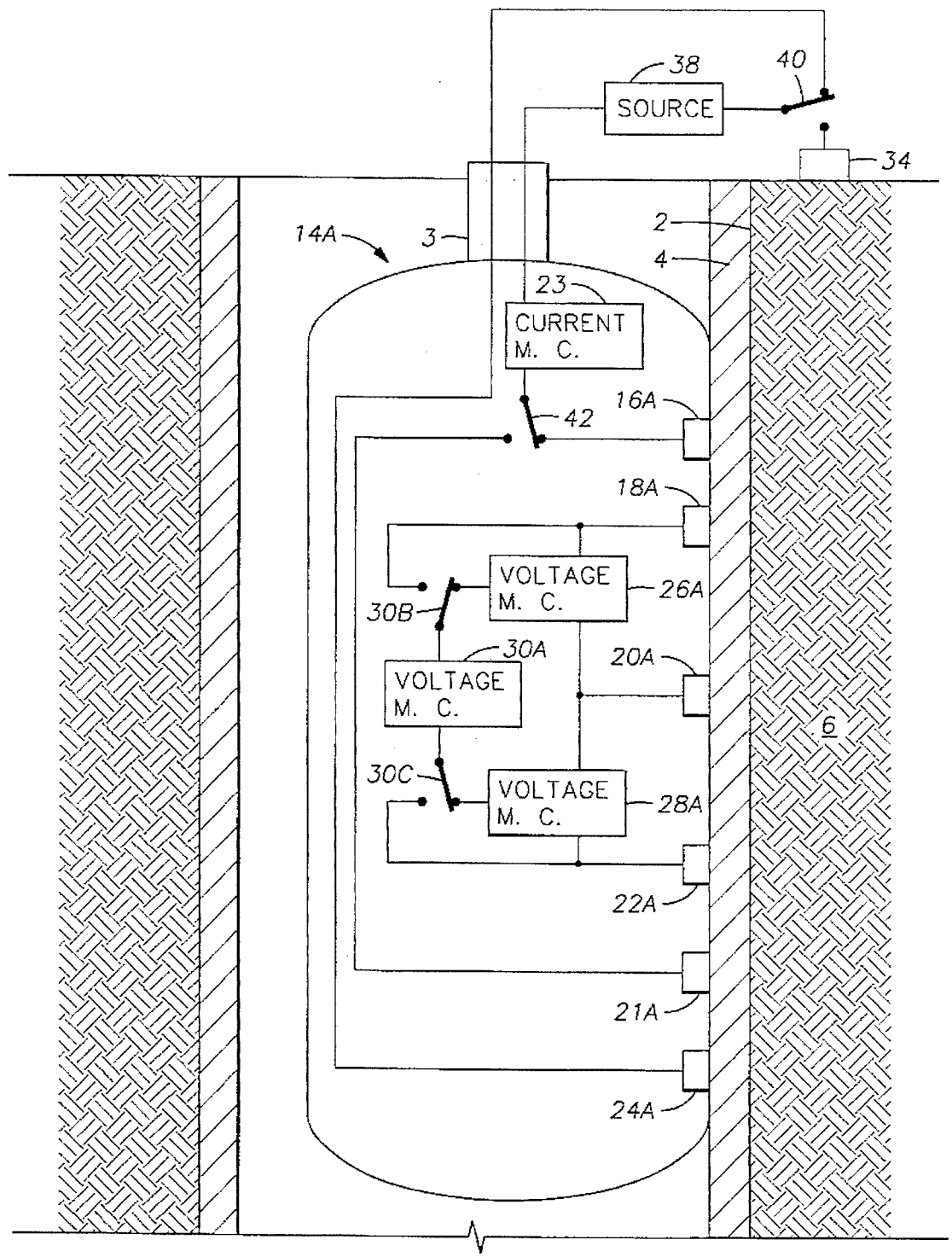
FIG. 5 shows a tool according to the present invention having current source and current return electrodes both located on the tool. The tool in FIG. 5 is configured to determine the casing resistance over a short interval corresponding to the short interval of the tool as in FIG. 3.

Referring now to FIG. 5, a sonde 14A according to the present invention is shown which includes an emitter electrode 16A, measuring electrodes 18A, 20A and 22A, all similar in function to the equivalent electrodes on the sonde (14 in FIG. 2) of the prior art. Similarly, the sonde 14A of the present invention can include first 26A, second 28A, and third 30A voltage measuring circuits and a telemetry unit (not shown) for transmitting the measurements made by the voltage measuring circuits to the earth's surface. In the present invention, the third measuring circuit 30A can be selectively connected directly between electrodes 18A and 22A through switching circuits 30B and 30C. Alternatively the third measuring circuit 30A can be selectively connected to measure the second difference between the first 26A and the second 28A voltage measuring circuits, similarly to the third measuring circuit (30 in FIG. 2) of the tool of the prior art (as shown in FIG. 2). The reason for selectively connecting the third measuring circuit 30A between electrodes 18A and 22A will be further explained.

The electrical configuration of the sonde 14A as shown in FIG. 5 is adapted to make the measurements of the casing 4 resistance between electrodes 18A and 20A, and 20A and 22A. The source 38 is shown connected through a first switch 42, which can be a telemetrically controlled switch (of a type known in the art and remotely controlled by the system operator) disposed inside the sonde 14A. The first switch 42 is shown in FIG. 5 as selected to make connection of the source 38 between the emitter electrode 16A and a current return electrode 24A. The casing 4 resistance measurements made in the electrical configuration of FIG. 5 are equivalent to the measurements made by the sonde (14 in FIG. 3) of the prior art as shown in FIG. 3. The switches 30B and 30C are selected to connect the third voltage measuring circuit 30A to measure the second difference of voltages between the first voltage measuring circuit 26A and the second voltage measuring circuit 28A. The second difference of voltages is measured. Casing resistances can be determined according to the relationship in equation (3).

Figure 6:
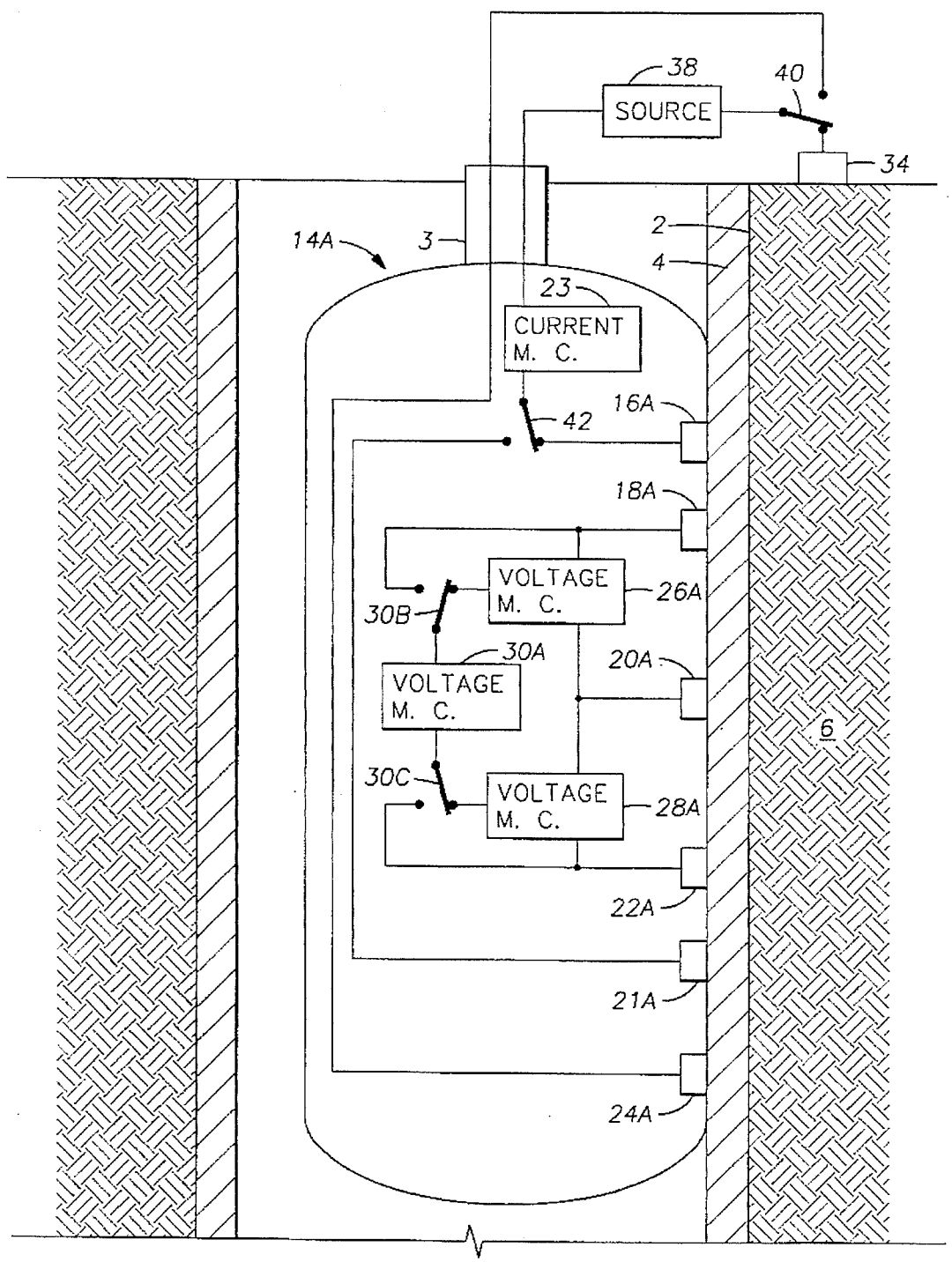
FIG. 6 shows the tool as in FIG. 5 configured to measure the current leakage over the short interval.

Referring now to FIG. 6, the sonde 14A and the current source 38 are shown electrically configured to make the voltage difference and second difference measurements across electrodes 18A and 20A, and 20A and 22A, respectively. These measurements correspond to the measurements made using the sonde (14 in FIG. 4) of the prior art as shown in FIG. 4.

Figure 7:
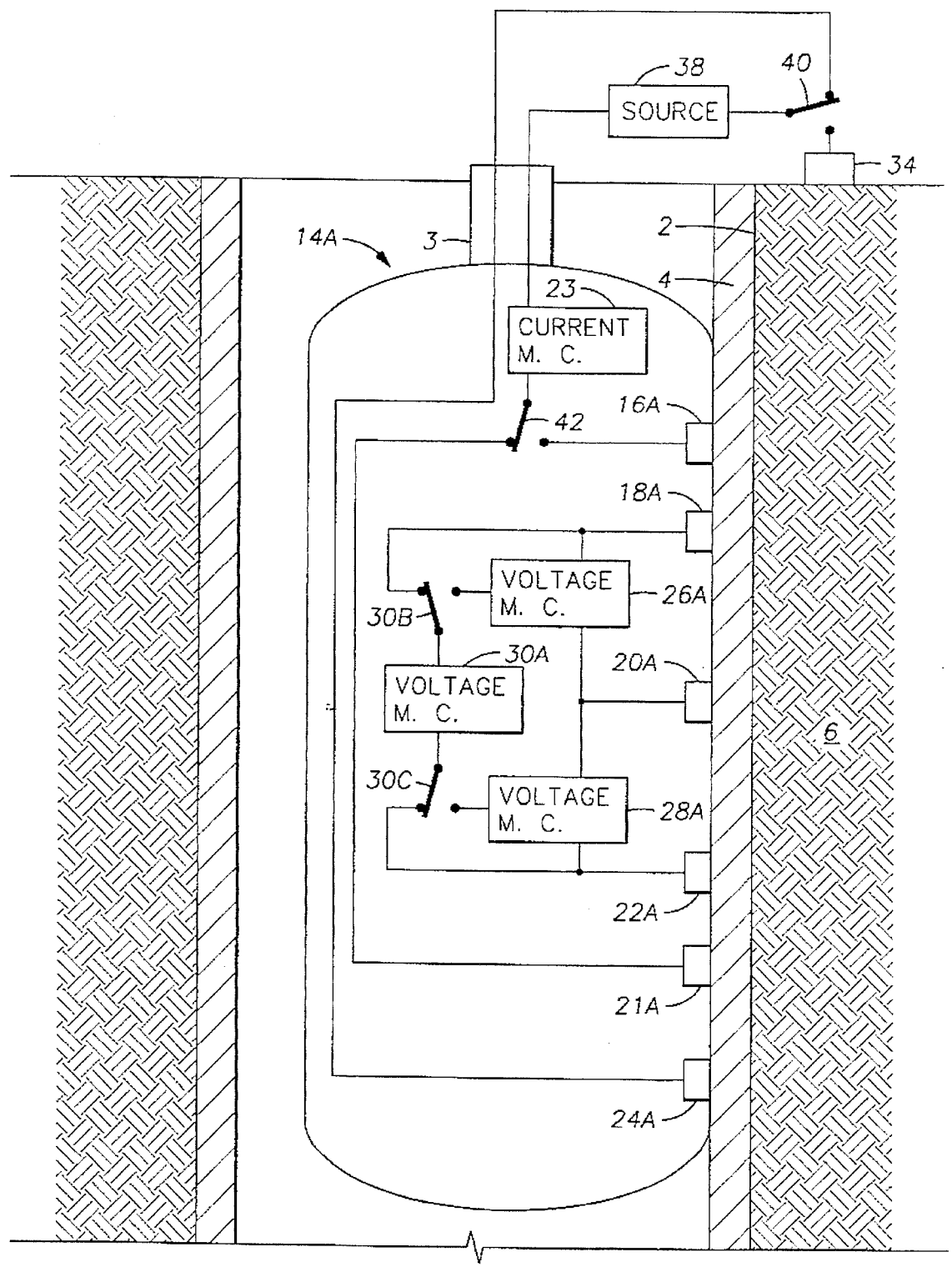
FIG. 7 shows the tool as in FIG. 5 configured to measure the characteristic impedance of the casing and the earth.

A novel aspect of the present invention is an arrangement of electrodes to make measurements for determining the characteristic impedance Q which eliminates the need to use a cable 3 having more than one insulated electrical conductor. Referring now to FIG. 7, the novel aspect of the present invention will be better explained. The electrical configuration of the sonde 14A shown in FIG. 7 is used to make the measurements for determining the characteristic impedance (Q). An additional current emitter electrode, shown at 21A, is included on the sonde 14A and can be selectively placed in electrical contact with the casing 4. The additional emitter electrode 21A is axially positioned on the sonde 14A so that a current path can be established having both source point and return point external to the axial positions of the measuring electrodes 18A, 20A and 22A. In FIG. 7, the first switch 42 is shown connecting one terminal of the source 38 to the additional emitter electrode 21A instead of to the emitter electrode 16A. A second switch 40 located at the earth's surface (and also controllable by the system operator) can selectively connect the other terminal of the source 38 to the current return electrode 24A. A current measuring circuit 23 can be interconnected in the current path between the source 38, and either the additional emitter 21A or the emitter 16A. The current measuring circuit 23 measures the total current output of the source 38, the use of which measurement will be further explained. The output of the current measuring circuit 23 can also be connected to the telemetry unit (not shown) for transmission of its measurements to the earth's surface for recording and observation as is understood by those skilled in the art.

The current source 38 in FIG. 7 is shown as being disposed at the earth's surface, as is the source shown in FIGS. 2, 3, and 4 (the prior art tool). The source 38, both in the prior art and in the present invention, is used to energize the casing 4 for measuring voltages across the electrodes (18A, 20A and 22A in FIG. 7). In the present invention, however, the source 38 can be located inside the sonde 14A because the current path during measurement of the characteristic impedance both originates and terminates at electrodes (21A and 24A) disposed on the sonde 14A. Having both terminals of the source 38 connected to electrodes on the sonde 14A during characteristic impedance measurements eliminates the need to use a second insulated electrical conductor in the cable 3 when making the measurement of the characteristic impedance (Q). Locating the source 38 inside the sonde 14A has the further advantage of providing a less resistive path for the electrical current when measuring the characteristic impedance, because the electrical conductor in the cable 3 is thus eliminated from the overall current path, thereby increasing the possible current flow, at any particular voltage, for making the characteristic impedance measurement. The insulated conductor in the electrical cable 3 typically has a resistance of several ohms per 100 feet in length, and for a typical length of cable would introduce a resistance of several hundred ohms in the circuit, greatly reducing the possible current at any particular voltage.

Figures 8A, 8B:
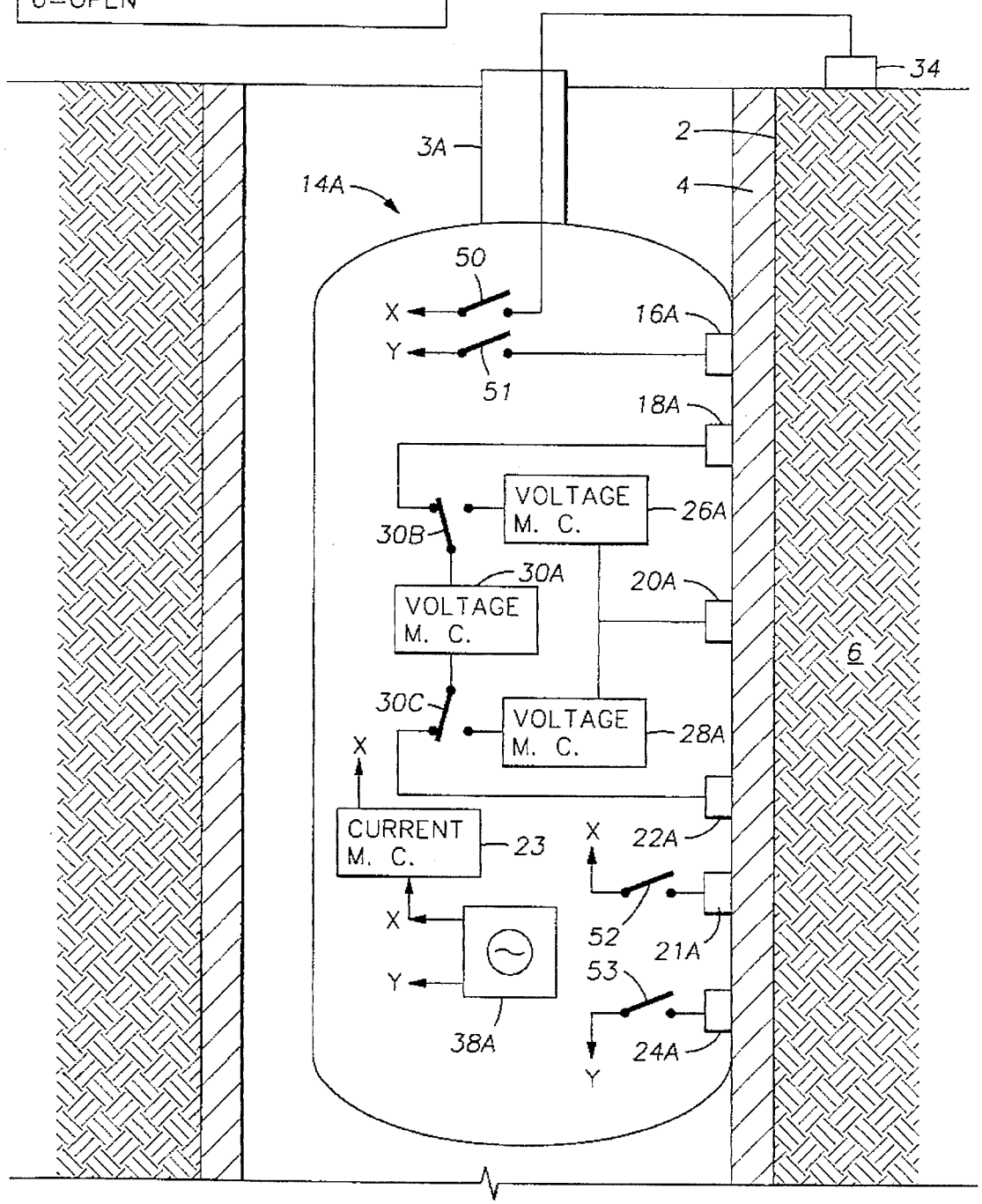
FIG. 8A shows the tool as in FIG. 5 having the source of electric current disposed within the tool.
FIG. 8B shows an operating table for selective switches to electrically configure electrodes on the tool to perform different types of measurements.

An alternative configuration of the present invention in which the source of electrical current is disposed inside the sonde can be observed by referring to FIG. 8A. The source is shown at 38A. Electrical connection of the terminals of the source 38A (shown as X and Y) can be selectively made to the appropriate electrodes 34, 16A, 21A, 24A through telemetrically controlled switches, shown at 50, 51, 52, 53. The telemetrically controlled switches can be of a type known in the art which can be remotely controlled by the system operator. FIG. 8B shows a table indicating the operative position of each one of the switches (50, 51, 52, 53) for each one of the three different measurements, as previously described, needed in order to determine formation resistivity, namely characteristic impedance, casing resistance and current leakage. A particular advantage of the arrangement shown in FIG. 8A is that only one insulated electrical conductor 3A is needed to conduct electrical current between the sonde 14A and the earth's surface. The system shown in FIG. 8A can therefore be used with armored electrical cable (3 in FIG. 2) having only one insulated electrical conductor.

It is to be understood that the configuration of the current source 38A and the switches 50, 51, 52, 53 shown in FIG. 8A is provided only as an example. The configuration in FIG. 8A is not to be construed as a limitation on the invention. For example, a configuration including an additional current source located at the earth's surface (such as 38 in FIG. 7, for example) in combination with the current source in the sonde (38A in FIG. 8) could also be used.

The particular improvement of the present invention over the prior art is the inclusion of the additional emitter electrode 21A to act as the source point for the electrical current during measurement of the characteristic impedance. The additional emitter 21A eliminates the need to measure voltage on the casing 4 with respect to the earth's surface while simultaneously energizing the casing 4 from a source disposed at the earth's surface. Therefore the sonde 14A of the present invention, having the additional emitter 21A, can be used with an electrical cable having only one insulated electrical conductor. The electrical equivalence of the arrangement of the present invention to that of the tool of the prior art will be further explained.

Referring once again to FIG. 7, the third voltage measuring circuit 30A is shown selectively connected, by means of telemetrically operable switches 30B and 30C, to measure the voltage drop directly across electrodes 18A and 22A, instead of measuring the second difference of the first 26A and second 28A measuring circuits. The reason for reconfiguring the measurement made by the third measuring circuit 30A during measurement of the characteristic impedance is that the voltage drop across the electrodes is substantially proportional to the spacing between the electrodes and the amount of current flowing along the casing. By selecting electrodes 18A and 22A, the amount of voltage drop measured will be increased.

In order to explain the electrical equivalence of the characteristic impedance measurements made by the sonde in FIG. 2 and the sonde in FIG. 7, the following description of the theory of the measurement is provided. In a system having substantially homogeneous casing 4 and substantially homogeneous earth formations 6, the distribution of electrical voltage and current, with respect to distance, Z, from the current injection point, (which in the present invention can be the additional emitter electrode shown at 21A in FIG. 7) can be determined by the expressions:

$$V(z) = R_c \lambda_L \frac{I_o}{2} \exp\left(-\frac{|z|}{\lambda_L}\right) \tag{9}$$

$$I(z) = \frac{I_o}{2} \exp\left(-\frac{|z|}{\lambda_L}\right) sgn(z) \tag{10}$$

$$J_r(z) = \frac{I_o}{2\lambda_L} \exp\left(-\frac{|z|}{\lambda_L}\right) \tag{11}$$

The term $\lambda_L$ in equations (9), (10) and (11) is referred to as the characteristic length. The characteristic length is specified by the resistivity of the earth formation 6 and the resistance per unit length of the casing 4. The characteristic length itself can be determined by the expression:

$$\lambda_L = \sqrt{k^{-1} \cdot \frac{\rho_f}{R_c}} \tag{12}$$

The characteristic length, depending on casing 4 resistance and formation resistivity, can be within a range of about 100 to several thousand meters.

Referring once again to FIG. 7, the sonde 14A is electrically configured so that the source 38 is connected between the additional emitter 21A and the current return 24A electrodes. When the source 38 is energized, current flows along the casing 4, both between the additional emitter 21A and current return 24A, and also, to some extent, up and down the casing 4 external to the two electrodes (21A, 24A). The amount of current flowing up and down the casing 4 externally to the additional emitter 21A and the current return 24A is related to the resistance of the casing 4 and the characteristic length. The third voltage measuring circuit 30A, as previously explained, can be selectively connected to measure voltage drop across electrodes 18A and 22A. This voltage drop, $V_o$ is related to the current flow along the casing $I_z$ according to the relationship:

$$I_z = \frac{V_o}{R_o} \tag{13}$$

where $R_o$ is the casing 4 resistance between electrodes 18A and 22A. The resistance between electrodes 18A and 22A can be determined by adding the resistances previously determined in the step of measuring casing resistance shown by the electrical configuration of the sonde 14A in FIG. 5. The casing 4 resistance can be determined by the expression:

$$R_o = R_1 + R_2 \tag{14}$$

From equation (10) however, the current flow along the casing 4 can be related to the magnitude of the injected current $I_o$ flowing between the additional emitter 21A and the current return 24A by the expression:

$$I_z = I_o \frac{\Delta z_o}{2\lambda_L} \quad (15)$$

where $\Delta Z_o$ is the distance between the additional emitter 21A and the current return 24A. The characteristic length can be estimated by the expression in equation (16):

$$\lambda_L = \frac{I_o \Delta z_o}{2I_z} \quad (16)$$

Having determined the characteristic length, the characteristic impedance can be determined by the expression:

$$Q = \frac{R_c \lambda_L}{2} \quad (17)$$

where the resistance per unit length of the casing 4 can be calculated from the previously determined casing resistance measurements. The relationship according to equation (17) for determining characteristic impedance is alone sufficient to determine the characteristic impedance Q when the measurement of Q is made within a casing 4 which is longer than the characteristic length $\lambda_L$, and the measurement is made more than a distance of approximately 0.1 $\lambda_L$ from the bottom of the casing. It is possible to model the current distribution when the measurement is made closer to the bottom of the casing to more precisely determine Q.

It is to be understood from the foregoing description of the principle of operation of the present invention that use of selective switches such as 30B and 30C in FIG. 7 to connect the third voltage measuring circuit 30A across electrodes 18A and 22A is a matter of convenience to the system designer. Including additional, axially spaced-apart electrodes (not shown) connected to additional voltage measuring circuits (not shown) could perform the same function as selective connection of the third measuring circuit 30A across electrodes 18A and 22A. It is also contemplated that the first 26A and second 28A voltage measuring circuits could be interconnected to the third measuring circuit 30A so that the third measuring circuit 30A measures the sum of the voltages across electrodes 18A and 22A.

It is also to be understood that the selected axial positions of the additional emitter 21A and current return 24A electrodes are a matter of convenience for the system designer. The only constraints on the axial positions of the electrodes are first that the voltage drop along the casing must be measured externally to the direct path between the additional emitter electrode 21A and the current return 24A in order to measure characteristic impedance (Q), and second that the casing resistance between the electrodes used to measure voltage drop must also be determined in order that the voltage drop measurement can be converted into a current measurement. It is also desirable, therefore, to provide a measurement of voltage drop at electrodes (such as 18A, 20A and 22A) in between the current source and return, such as in the electrical configuration shown in FIG. 5. Increasing the axial spacing between the additional emitter 21A and the current return 24A will increase the amount of current flow $I_z$ along the casing 4, and therefore, the voltage $V_o$ measured across electrodes 18A and 22A during measurement of Q, which can improve the accuracy which with Q is determined.

DESCRIPTION OF A PARTICULAR EMBODIMENT

The voltage measuring circuits (such as 26A, 28A, 30A, 23 in FIG. 7) of the present invention typically comprise analog-to-digital converters (ADC's—not shown separately in FIG. 7). Each ADC converts the voltages detected across the respectively connected electrodes into a series of numbers representing the magnitude of the voltage sampled at spaced apart time intervals. As is understood by those skilled in the art, the spaced apart time intervals can be controlled by selectively applying control (clock) pulses to a clock input on each ADC.

It is desirable to synchronize each alternating current cycle of the current source (38 in FIG. 7) to the spaced apart time intervals at which the ADC generates samples. Synchronization of the spaced apart time intervals comprises generating digital samples at substantially the same relative time position along each successive cycle of the current, and preferably includes generating a digital sample at the exact beginning of each cycle and having an integer number of samples generated during each cycle. Synchronization is desirable because the voltages at the electrodes typically include large components which are out-of-phase with the current source (38 in FIG. 7). The out-of-phase components are preferably rejected during signal processing to extract in-phase components of the detected voltages more efficiently. Synchronizing the ADC to the current source 38 improves the efficiency of rejecting out-of-phase components of the measurements, as is understood by those skilled in the art. Another advantage of synchronizing the current source 38 to the digital sampling of the ADC is that digital signal processing of the series of numbers generated by the ADC, which may include filtering, stacking and mixing, is improved in efficiency.

Figure 9:
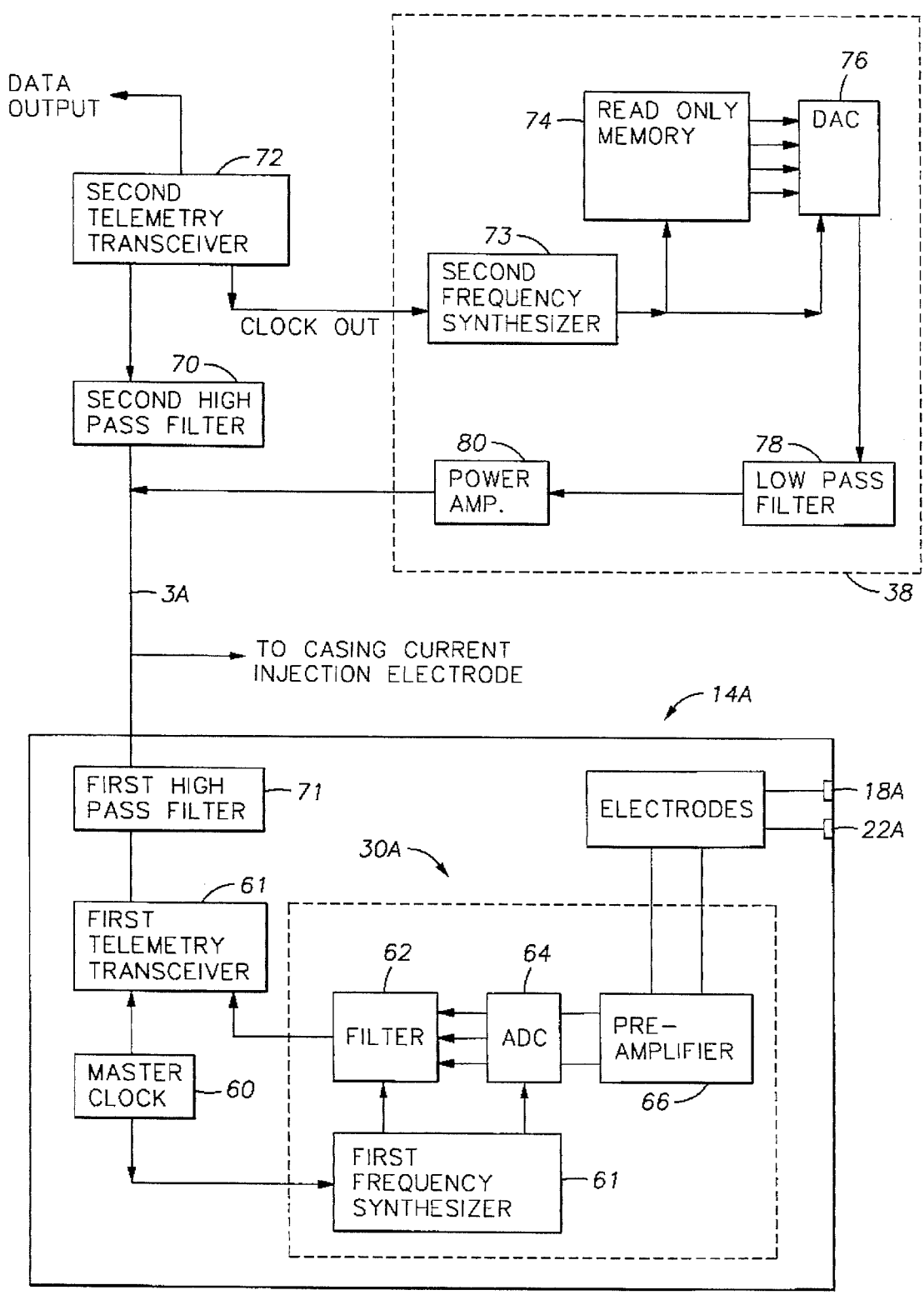
FIG. 9 shows a telemetry system for the tool of the present invention.

A system for synchronizing the current source 38 to the operation of the ADC can be observed by referring to FIG. 9. One of the voltage measuring circuits (such as 30A in FIG. 7) is shown in more detail as a block diagram in FIG. 9. The voltage measuring circuit 30A can comprise an analog pre-amplifier 66. The input of the pre-amplifier 66 is connected to the electrodes across which voltage is to be measured (such as 18A and 22A in FIG. 7, for example). The pre-amplifier 66 output is conducted to an analog-to-digital converter (ADC) 64. In the present embodiment the ADC 64 can include a delta-sigma modulator such as one made by Crystal Products Company and sold under model designation CSC5323. The output of the ADC 64 is conducted to a digital filter, which in the present embodiment can be a finite impulse response (FIR) filter 62. The FIR filter 62 can be a unit made by Crystal Products Company sold under model designation CS5322. The output of the FIR filter 62 comprises multiple-bit digital words representing the magnitude of the voltage across the electrodes 18A, 20A sampled at spaced apart time intervals.

The spaced apart time intervals correspond to an integer number of cycles of a master clock 60, which drives both the ADC 64 and the FIR filter. The master clock 60 preferably operates at a frequency of 16.384 megahertz (MHz). The master clock drives a first frequency synthesizer 61 the output of which is connected to a clock input on the FIR filter 62 and a clock input on the ADC 64. The first frequency synthesizer 61 operates the ADC 64 and the FIR filter 62 to generate digital samples at a rate which is an integer multiple of the operating frequency of the current source (38 in FIG. 7), as will be further explained. The master clock 60 also drives a first telemetry transceiver 68 which serially formats the digital words output from the FIR filter 62 and transmits the serially formatted words over a cable conductor 3A to a second transceiver 72 typically located at the earth's surface. The first transceiver 68 is electrically coupled to the cable conductor 3A through a first high pass filter 71 which substantially excludes current from the source 38 from entering the first transceiver 68.

The second transceiver 72 is electrically coupled to the cable conductor 3A through a second high-pass filter 70, which blocks entry into the second transceiver 72 of current from the source 38. The second transceiver 72 decodes the telemetry signal transmitted from the first transceiver 68, and reformats serially transmitted data comprising the measurements made by the voltage measuring circuit 30A for display, recording and observation, as is understood by those skilled in the art. The second transceiver 72 also extracts a clock signal from the signal transmitted by the first transceiver 68. The clock signal is generated at a rate which corresponds to the telemetry frequency of the first transceiver 68. Because the first transceiver 68 is operated by the master clock 60, any frequency change in the master clock 60, and correspondingly, the operating rate of the ADC 64 and the FIR filter 62, will cause corresponding change Ln the rate of the clock signal extracted by the second transceiver 72. As is understood by those skilled in the art, frequency change in the master clock 60 may result from changes in ambient temperature.

The clock signal extracted by the second transceiver 72 can be conducted to a second frequency synthesizer 73. The second synthesizer 73 converts the clock signal into a lower frequency control signal which operates a read-only-memory (ROM) 74. The ROM 74 includes numbers which represent the magnitude of the electrical current, sampled at spaced apart time intervals, which is to be generated by the source 38. Since the clock signal is temporally "locked" to the operating rate of the master clock 60, the rate at which numbers are output from the ROM 74, and consequently the rate at which the source 38 runs through each alternating current cycle, will be synchronized with the operation of the ADC 64 and the FIR filter 62. Preferably, the FIR filter 62 generates an integer number of words during each cycle of the source 38, and the initiation of one cycle of the source 38 (at a so-called "zero-crossing") is substantially time coincident with the time of generation of one of the words output from the FIR filter 62 in order to facilitate digital signal processing of the digital words output from the FIR filter 62.

The output of the ROM 74 is conducted to a digital-to-analog converter (DAC) 76, which converts the numbers from the ROM 74 into a corresponding analog voltage magnitude, thereby generating the electrical current substantially synchronously with operation of the ADC 64 and the FIR filter 62. The output of the DAC 76 is conducted through a low-pass filter 78 to a power amplifier 80. The low pass filter 78 reduces the possibility of residual out of band current from the power amplifier 80 from interfering with the telemetry signal. The output of the power amplifier 80 is connected to the cable conductor 3A.

An important feature of the current source 38 of the present embodiment is that the frequency output of the source 38 can be changed by the system operator controlling the frequency synthesizers 61, 73. the significance of the frequency selection will be further explained. As is understood by those skilled in the art, the frequency synthesizers 61, 73 can generate predetermined frequencies derived from the master clock 60 frequency by the system operator entering appropriate numerical coefficients into the synthesizers 61, 73. As a practical matter the coefficients should form part of the programming of a computer (not shown) to facilitate entry of the coefficients as needed by the system operator.

The operation of the first frequency synthesizer 61 can be controlled by the system operator entering appropriate commands into telemetry signals generated by the second transceiver 72. The commands can be decoded by the first transceiver 68 and conducted to the first synthesizer 61.

The shape of the alternating current waveform of the electrical current generated by the source 38 can be changed by substitution of different numbers in the ROM 74. In the present embodiment of the invention, the ROM can be programmed with numbers which cause generation of a sine wave, and the second synthesizer 73 can operate the ROM to cause generation of current within a frequency range of 0.1 to 15 Hz. The frequency is selectable by the system operator to minimize interference with the telemetry, to improve the capability of the voltage measuring circuits (such as 30A in FIG. 7) to measure very small voltages, particularly if there is any DC interference from natural voltage sources along the casing, as is understood by those skilled in the art. The frequency can also be selected to improve the depth of investigation of the formation resistivity measurement made by the invention. Depth of investigation is maintained by using low-frequency current such as the 0.1 to 15 Hz in the present embodiment because lower frequencies reduce inductive power loss in the conductive casing 4.

Voltage measurement data extracted from the telemetry signal and output from the second transceiver 72 can be recorded and processed by other equipment (not shown) located at the earth's surface.

In the particular embodiment described herein, the source 38 can be disposed at the earth's surface. It is to be understood that it can also be desirable to synchronize to the master clock 60 a current source which is disposed within the sonde (such as the source shown at 38A in FIG. 8A). Synchronization of the source (38A in FIG. 8A) disposed in the sonde 14A can be accomplished by conducting the output of the master clock (60 in FIG. 9) through additional frequency synthesizers (not shown) directly to a ROM (similar to the one shown at 74 in FIG. 9) and a DAC (similar to the one shown at 76 in FIG. 9).

DESCRIPTION OF AN ALTERNATIVE EMBODIMENT

Figure 10A:
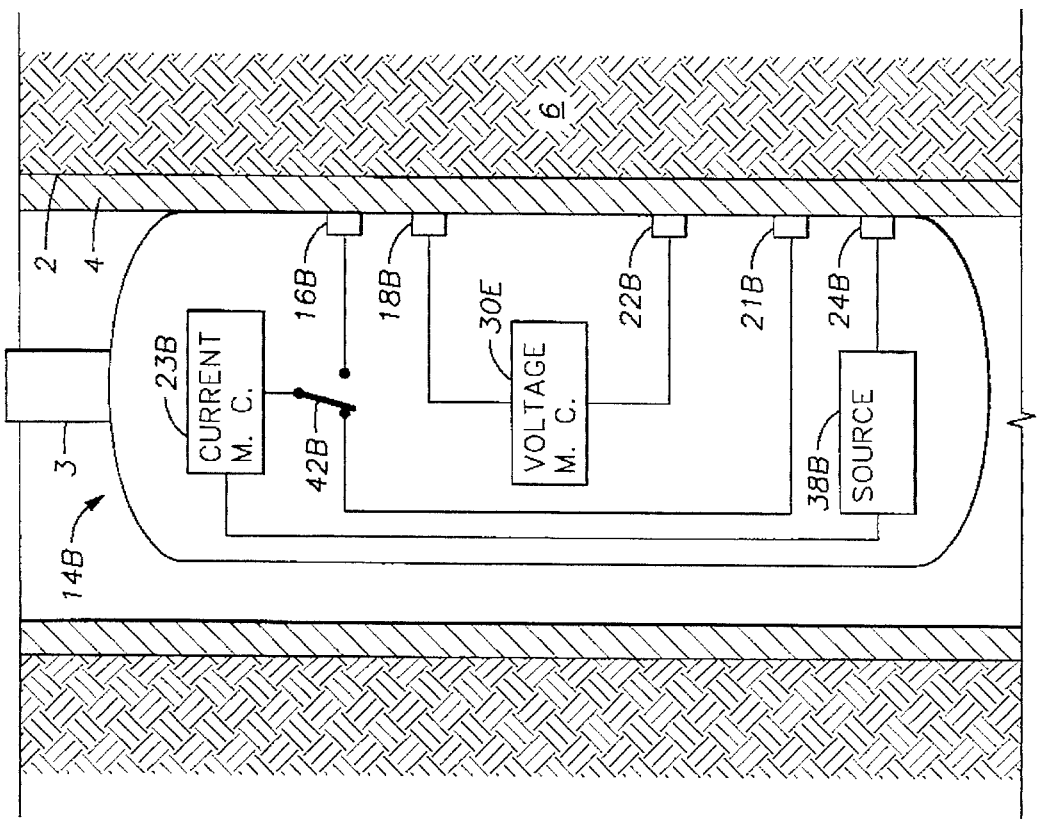
FIG. 10A shows an alternative embodiment of the invention electrically configured in the mode to determine casing resistance.

Another embodiment of the present invention can be observed by referring to FIG. 10A. A sonde 14B includes current injection electrodes, shown at 16B, 21B and 24B and measuring electrodes, shown at 18B and 22B and adapted to electrically contact the casing 4. The sonde 14B also includes a current source 38B which can be similar to the current source 38A in the first embodiment of the invention. The sonde also can include a current measuring circuit 23B, a voltage measuring circuit 30E and a telemetrically controlled switch 42B, each of which can be similar in form and function to the corresponding components in the first embodiment of the invention. Measurements made by the current measuring circuit 23B and the voltage measuring circuit 30E can be transmitted telemetrically over the cable 3 for observation and recording as in the first embodiment of the invention.

The electrical configuration shown in FIG. 10A is adapted to measure the resistance of the casing 4 between measuring electrodes 18B and 22B. The switch 42B is selected so that the source 38B is connected between injection electrodes 16B and 24B, which include the measuring electrodes 18B, 22B between them. The current magnitude, determined by measuring circuit 23B and referred to by the value $I_n$, is related to the casing resistance from the amount of voltage drop measured by the voltage measuring circuit 30E according to the expression:

$$R_0 = \frac{V_o}{I_n} \qquad (18)$$

Figure 10B:
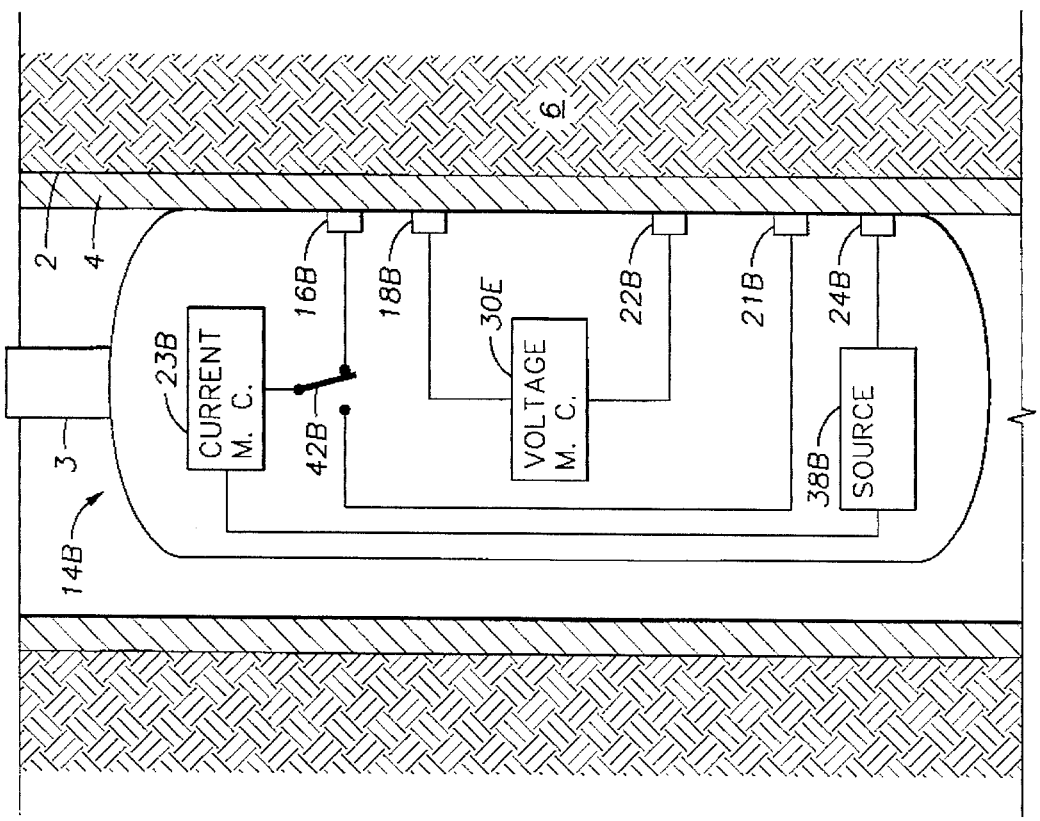
FIG. 10B shows an alternative embodiment of the invention electrically configured to determine formation resistivity.

The measurement of casing resistance can be used with a measurement of voltage made when the sonde 14B is electrically configured as shown in FIG. 10B. In FIG. 10B, the switch 42B is selected to connect the current source 38B between injection electrodes 16B and 24B. Voltage is measured between electrodes 18B and 22B. In the electrical configuration of FIG. 10B, the current is injected and returned at electrodes axially spaced to exclude measurement of voltage between them. The formation resistivity can be determined according the expression:

$$\rho_a = k\, R_c\, \lambda_L^2 \qquad (19)$$

where $\lambda_L$ can be determined from the expression in equation (16).

Particular advantages of determining the formation resistivity using the electrical configurations in FIGS. 10A and 10B are that no surface electrodes are needed, which eliminates having to conduct very small voltages along the electrical cable 3 and that the sensitivity of the measurement to the determination of casing resistance is reduced. The measurement provided by the electrical configurations in FIGS. 10A and 10B also provide reduced radial depth of investigation. It is contemplated that a sonde configured according to FIG. 10A and FIG. 10B could be combined with an electrical configuration of electrodes and a source according to FIG. 8A in order to provide multiple depths of investigation.

Those skilled in the art will be able to readily devise other embodiments of the invention disclosed herein without departing from the spirit of the invention. Accordingly the invention should be limited in scope only by the claims appended hereto.

What is claimed is:

1. An apparatus for measuring resistivity of an earth formation penetrated by a wellbore, said wellbore having a conductive casing inserted therein, said apparatus comprising:

an elongated sonde adapted to traverse the interior of said casing;

a plurality of electrodes disposed on said sonde at axially spaced apart locations, said electrodes adapted to be placed in electrical contact with said casing;

voltage measuring circuits, each of said circuits connected between a pair of said electrodes, each one of said pairs corresponding to a different non-overlapping axial interval along said sonde;

a voltage difference measuring circuit interconnected to two of said voltage measuring circuits, said voltage difference measuring circuit adapted to measure a second difference in voltage measured between said two of said voltage measuring circuits;

a source of electrical current selectively connectable between a first one and a second one of said electrodes, said first and second electrodes unconnected to said voltage measuring circuits and axially positioned to include said pairs of electrodes therebetween for measuring a resistance of said casing between said pairs of electrodes, said source selectively connectable between another two of said electrodes, said another two of said electrodes unconnected to said voltage measuring circuits and axially positioned to exclude said pairs of electrodes therebetween for measuring a characteristic impedance of said casing and said earth formation, said source selectively connectable between said first electrode and a surface return electrode disposed at the earth's surface for measuring current leakage into said formation;

a current measuring circuit for measuring current output of said source to enable determination of resistance related to voltages measured by said voltage measuring circuits; and means for recording measurements made by said voltage measuring circuits, said voltage difference measuring circuit and said current measuring circuit.

2. The apparatus as defined in claim 1 wherein said source of electrical current is disposed within said sonde and wherein said apparatus further comprises selectively operable switches for selectively interconnecting said source between said first and said second electrodes, between said another two of said electrodes and between said first electrode and said surface return electrode.

3. The apparatus as defined in claim 1 wherein said source of electrical current comprises:

a first power supply disposed at the earth's surface and connected to said sonde to conduct electrical current between said first electrode and said surface return electrode; and a second power supply disposed within said sonde, said second power supply selectively connectable between said first and said second electrodes, said second power supply selectively connectable between said another two of said electrodes.

4. The apparatus as defined in claim 1 wherein each of said voltage measuring circuits comprises an analog-to-digital converter.

5. The apparatus as defined in claim 4 further comprising a first frequency synthesizer coupled to a master clock, said first synthesizer generating timing pulses coupled to said analog-to-digital converters so that digital samples are generated by said analog-to-digital converters at a rate corresponding to an integer number of cycles of said master clock.

6. The apparatus as defined in claim 5 wherein said source of electrical current comprises a read only memory, a digital-to-analog converter coupled to said memory and a second frequency synthesizer operatively coupled to said master clock and to said memory, said second synthesizer adapted to operate said memory for generating digital values of magnitude of output of said source, said synthesizer coupled to said master clock for operating said memory so as to generate cycles of said electrical current commencing substantially synchronously with generation of digital samples by said analog-to-digital converters.

7. The apparatus as defined in claim 6 wherein said source of electrical current comprises output frequencies having integer numbers of samples generated by said analog-to-digital converters within a single cycle of said electrical current.

8. The apparatus as defined in claim 7 wherein said master clock operates a first telemetry transceiver disposed in said sonde and a second telemetry transceiver disposed at the earth's surface, said second telemetry receiver adapted to extract a clock signal from a telemetry frequency of said first telemetry transceiver, and wherein said source of electrical current is disposed at the earth's surface and is timed by said clock signal extracted by said second telemetry transceiver.

9. A method of determining resistivity of an earth formation penetrated by a wellbore, said wellbore having a conductive tubular casing inserted therein, said method comprising the steps of:

inserting a sonde into said wellbore, said sonde having a plurality of electrodes at axially spaced apart locations, said electrodes adapted to electrically contact said casing;

applying electrical current between a first one and a second one of said electrodes and measuring a magnitude of said current;

measuring a first voltage between a first pair of said electrodes axially positioned between said first one and said second one of said electrodes, said first voltage corresponding to a resistance of said casing between said first pair of electrodes;

measuring a second voltage between a second pair of said electrodes axially positioned between said first one and said second one of said electrodes and axially positioned externally to said first pair of electrodes, said second voltage corresponding to said resistance of said casing between said second pair of electrodes;

measuring a second difference between said first and said second voltages;

applying electrical current and measuring the amount thereof between other ones of said electrodes, said other ones of said electrodes axially positioned to exclude a third pair of electrodes therebetween;

measuring a third voltage between said third pair of said electrodes, said third voltage corresponding to a current flow magnitude related to said resistance of said casing and a characteristic impedance of said casing and said earth formation;

applying electrical current between said first one of said electrodes and a surface return electrode disposed at the earth's surface;

measuring a fourth voltage between said first pair;

measuring a fifth voltage between said second pair, said fourth and said fifth voltages corresponding to amounts of current flowing along said casing axially between said first and said second pair, respectively;

measuring an additional second difference of voltages between said fourth voltage and said fifth voltage; and determining said resistivity of said earth formation by combining said measurements of said first voltage, said second voltage, said third voltage, said fourth voltage, said fifth voltage, said current magnitude, said second difference and said additional second difference of said voltages.

10. The method as defined in claim 9 wherein said electrical current is generated by:

a first power supply disposed at the earth's surface and connected to said sonde to conduct electrical current between said first one of said electrodes and said surface return electrode disposed at the earth's surface; and a second power supply disposed in said sonde, said second power supply selectively interconnected to ones of said electrodes axially spaced apart to include said first and said second pairs of electrodes therebetween, said second power supply selectively interconnected to other ones of said electrodes axially spaced apart to exclude said third pair of electrodes therebetween.

11. The method as defined in claim 9 wherein said first pair and said second pair of electrodes are contiguous and share a common electrode therebetween.

12. A method of determining resistivity of an earth formation penetrated by a wellbore, said wellbore having a conductive casing inserted therein, said method comprising the steps of:

inserting a sonde having a plurality of electrodes disposed thereon into said wellbore, said electrodes adapted to electrically contact said casing, said electrodes disposed at axially spaced apart locations along said sonde;

injecting electrical current and measuring a magnitude thereof between a first one and a second one of said electrodes, said first one and said second one axially spaced to include therebetween a pair of said electrodes connected to a voltage measuring circuit;

measuring a first voltage between said pair of electrodes;

injecting said electrical current and measuring said magnitude thereof between said first electrode and a third electrode, said first and said third electrode axially spaced to exclude said pair of electrodes therebetween;

measuring a second voltage between said pair of electrodes; and determining said resistivity of said earth formation by combining said first voltage, said second voltage and said magnitudes of electrical current.

* * * * *